United States Patent
Briick

(10) Patent No.: US 7,026,918 B2
(45) Date of Patent: Apr. 11, 2006

(54) MOTOR VEHICLE VERIFICATION AND CONTROL SYSTEM

(76) Inventor: David Douglas Briick, 5365 Punkintown Rd., Douglasville, GA (US) 30135

( * ) Notice: Subject to any disclaimer, the term of this patent is extended or adjusted under 35 U.S.C. 154(b) by 67 days.

(21) Appl. No.: 10/649,573

(22) Filed: Aug. 26, 2003

(65) Prior Publication Data

US 2004/0036584 A1 Feb. 26, 2004

Related U.S. Application Data

(60) Provisional application No. 60/405,955, filed on Aug. 26, 2002.

(51) Int. Cl.
*B60R 25/10* (2006.01)
(52) U.S. Cl. ................. 340/426.11; 180/287; 307/10.2
(58) Field of Classification Search ............. 340/426.1, 340/476.22, 426.16, 426.36, 426.13, 426.11, 340/426.19; 307/10.2; 180/271, 287, 277, 180/283; 342/457
See application file for complete search history.

(56) References Cited

U.S. PATENT DOCUMENTS

| | | | |
|---|---|---|---|
| 3,803,551 A | 4/1974 | Jordan ........................ 180/114 |
| 4,177,466 A | 12/1979 | Reagan ................. 343/112 TC |
| 4,477,874 A | 10/1984 | Ikuta et al. ............ 340/875.31 |
| 4,754,255 A * | 6/1988 | Sanders et al. ............ 307/10.4 |
| 4,878,050 A * | 10/1989 | Kelley .................... 340/825.69 |
| 5,276,728 A * | 1/1994 | Pagliaroli et al. ........ 455/404.1 |
| 5,310,999 A * | 5/1994 | Claus et al. ................. 235/384 |
| 5,459,304 A | 10/1995 | Eisenmann ................. 235/380 |
| 5,519,260 A | 5/1996 | Washington ............... 307/10.5 |
| 5,602,375 A | 2/1997 | Sunahara et al. ........... 235/384 |
| 5,657,008 A * | 8/1997 | Bantli ........................ 340/933 |
| 5,729,192 A | 3/1998 | Badger ....................... 340/426 |
| 5,898,391 A * | 4/1999 | Jefferies et al. ............. 340/988 |
| 6,121,922 A | 9/2000 | Mohan .................... 342/357.1 |
| 6,163,251 A | 12/2000 | Escareno et al. ........... 340/426 |
| 6,164,730 A | 12/2000 | Main ........................... 303/89 |
| 6,166,627 A | 12/2000 | Reeley ....................... 340/426 |
| 6,166,688 A | 12/2000 | Cromer et al. ......... 342/357.17 |
| 6,172,640 B1 | 1/2001 | Durst et al. ............ 342/357.07 |
| 6,172,644 B1 | 1/2001 | Stilp .......................... 342/457 |
| 6,175,308 B1 | 1/2001 | Tallman et al. ............. 340/539 |
| 6,366,222 B1 * | 4/2002 | Russell, Jr. ................. 340/933 |
| 6,606,033 B1 * | 8/2003 | Crocker et al. ............. 340/901 |

* cited by examiner

*Primary Examiner*—Brent A. Swarthout
(74) *Attorney, Agent, or Firm*—Sandra M. Drummond; Myers & Kaplan, LLC; Joel D. Myers

(57) ABSTRACT

A motor vehicle verification and control system providing a remote activator enabling locating, monitoring and disabling of an equipped vehicle, a receiver for analog, digital, broadband, satellite (i.e. GPS), green light and/or infrared signal technologies, a remote infrared target for disabling an equipped vehicle, an interactive license plate coupled with the remote infrared target for disabling means, and a license scanner that enables law enforcement to regulate the speed, operation and traveling distance of a vehicle.

25 Claims, 4 Drawing Sheets

MOTOR VEHICLE VERIFICATION AND CONTROL SYSTEM

CROSS-REFERENCE TO RELATED APPLICATION

To the full extent permitted by law, the present application claims priority to and the benefit as a non-provisional application to provisional patent application entitled "Motor Vehicle Verification and Control System" filed on Aug. 26, 2002, having assigned Ser. No. 60/405,955.

TECHNICAL FIELD

The present invention relates generally to remote vehicle sensing devices and, more specifically, to a motor vehicle verification and control system having a remote activator capable of locating, monitoring and disabling an equipped vehicle, having a receiver for analog, digital, broadband, satellite (i.e. GPS) and/or infrared signal technologies, having a remote infrared target for disabling an equipped vehicle, having an interactive license plate coupled with a remote infrared target for vehicle-disabling means, and having a license scanner enabling law enforcement to regulate the speed, operation and traveling distance of a vehicle.

BACKGROUND OF THE INVENTION

Vehicle ownership enables an individual to freely move from place to place. The price of such freedom includes legal and financial responsibilities. Unfortunately, drivers frequently operate vehicles without a valid license. Even more prevalent is the number of uninsured drivers. These factors contribute to health care costs and insurance premiums that are often prohibitive and thus financially preclude some individuals from owning and/or operating a car.

Vehicle theft also continues to be a problem, especially in concentrated urban areas. Although law enforcement authorities police the roads, they must rely on information from vehicle registration, licensing and renewal processes that are largely antiquated, thereby further hindering successful location of a missing vehicle. However, to assist in location of such missing vehicles, global positioning systems (GPS) are utilized to determine the location of a vehicle equipped with a global positioning device.

Unfortunately, upon discovering a stolen vehicle, officers must often participate in dangerous and potentially deadly high-speed chases to retrieve the vehicle. Recognizing the need to decrease or eliminate the number of high-speed chases, devices have been proposed to remotely disable a vehicle. Some such devices are installed in a vehicle and can be activated by appropriate authorities via radar or GPS to disable a vehicle, or can be remotely disabled through the use of analog and/or digital signals.

Instead of aiding in locating or disabling a stolen vehicle, other alternatives may perform as a means of theft prevention, wherein a user's driver's license includes prerecorded/precoded information regarding the authorized drivers of a particular vehicle and an on-board scanner that reads the license to enable or prohibit operation of the vehicle. Such "smart-card" technology limits a vehicle's use to authorized users only. Another type of smart-card, wherein information regarding a user's motor vehicle registration, driver's license, insurance, violations and/or vehicle inspection is accessible via scanning, could be helpful in the event of a police stop.

Each of the aforementioned devices are disadvantageous in view of the present invention because law enforcement officials are limited to gathering information on an individual or on the whereabouts of a vehicle, and to fully disabling a vehicle. Problem drivers such as, for exemplary purposes only, habitual speeders, probationers with limited mobility rights or others whose driving needs to be limited, monitored or otherwise controlled, but not completely prevented, are unable to be addressed with presently available devices.

Therefore, it is readily apparent that there is a need for a motor vehicle verification and control system that provides a remote activator capable of locating, monitoring and disabling an equipped vehicle, a receiver for analog, digital, broadband, satellite (i.e. GPS) and/or infrared signal technologies, a remote infrared target for disabling an equipped vehicle, an interactive license plate coupled with the remote infrared target for disabling means, and a license scanner that enables law enforcement authorities to regulate the speed, operation and traveling distance of a vehicle, thus preventing the above-discussed disadvantages.

BRIEF SUMMARY OF THE INVENTION

Briefly described, in a preferred embodiment, the present invention overcomes the above-mentioned disadvantages, and meets the recognized need for such a device, by providing a transportation information and control system having physical components for controlling, tracking or disabling a vehicle, computer technologies for operating the physical components and a delivery system for receiving and transferring information and commands from remote sources, such as, for exemplary purposes only, analog, digital, broadband, satellite, green light and/or infrared technologies.

According to its major aspects and broadly stated, the present invention is a vehicle authority device enabling law enforcement officials and other appropriate authorities to locate, disable, monitor or control a motorized vehicle from a remote position, wherein a computerized receiver or brain is connected to a vehicle's master computer enabling receipt of signals such as, for exemplary purposes only, analog, digital, broadband, satellite, green light and/or infrared signals broadcasted by an authority figure, and wherein resulting interpretation of the signal enables locating or disabling of the vehicle. The device also incorporates an interactive license plate into the system, wherein the license plate serves as a remote infrared target for disabling a vehicle, and a driver's license scanner, wherein a smart-card license is preprogrammed by authorities to identify a driver and control the speed, operation and geographical boundaries of travel for an individual.

More specifically, the present invention is a multi-component verification and control system for motor vehicles, wherein an on-board microprocessor and receiver is installed and communicatively linked to a vehicle's master computer. The on-board microprocessor and receiver, or computer brain, receives remotely generated and preferably encrypted signals such as, for exemplary purposes only, analog, digital, G3, broadband, satellite, green light and/or infrared signals, and interprets the signals to determine the time line for operation of a vehicle, wherein operation of a vehicle may continue, uninterrupted, until expiration of the time line or until intervention by a monitoring agency, wherein the vehicle master computer becomes a slave, overwritten and controlled by the system computer brain, and may be remotely monitored or disabled.

A target for receiving signals from an infrared digital device may be installed on an exterior surface of an equipped vehicle, wherein disabling infrared signals may be sent thereto from a helicopter or other air support vehicle. The target can also activate remote devices such as, for exemplary purposes only, traffic monitoring cameras, thereby notifying appropriate authorities of a violation.

An on-board display and scanner module may be utilized to enable a monitoring agency to obtain information regarding a vehicle operator via direct scanning of his or her driver's license, enabling remote restriction of vehicle operation or performance, as necessary. The display module provides authorities with safe and direct contact with a vehicle operator and the scanner module enables receipt of credit cards for payments of tolls, fines, parking fees and other charges. In addition, the module enables an owner to selectively limit operation of his vehicle to specific individuals, a limited geographic area, a limited operational period, or limited speeds.

The on-board microprocessor and receiver, or computer brain, may be communicatively linked to a specifically encoded, interactive license plate enabling direct disablement of an equipped vehicle via a remote infrared target and enabling indirect disablement of an equipped vehicle via the unique code. An auxiliary license plate may also be provided, wherein commercial carriers can remotely communicate data such as, for exemplary purposes only, weight, cargo, destination and originator. A towing module may also be incorporated, wherein a monitoring agency may be notified of any unauthorized towing and wherein a trailer towed by an equipped vehicle can be monitored. Safety features incorporated into the multi-component motor vehicle verification and control system include automatic deactivation following tampering with any component thereof.

The multi-component motor vehicle verification and control system includes monitoring agency software for controlling transmission and receipt of encrypted data such as, but not limited to, vehicle registration data, outstanding fees and fines, driver information, insurance details and vehicle tracking data. The software interprets the information received and determines an appropriate course of action. A limited function, secondary device could be provided to enable vehicle tracking and means of direct notification to a monitoring authority of unauthorized operation or other inappropriate actions. Such secondary devices could be utilized by corporations, lien holders, insurers, car rental agencies and other appropriately interested parties.

In addition, the multi-component motor vehicle verification and control system could provide an authoritative monitoring agency with a source of revenue, wherein rights can be licensed for the manufacture of compatible peripheral devices such as, for exemplary purposes only, traffic cameras, speed and toll devices and of potentially integrated components such as, for exemplary purposes only, personal data assistants, cellular telephones and other wireless telecommunications devices.

A feature and advantage of the present invention is the ability of such a device to provide remote locating, monitoring, controlling and disabling of an equipped vehicle.

A feature and advantage of the present invention is the ability of such a device to enable mobile receipt of analog, digital, broadband, satellite (i.e. GPS) and/or infrared signal technologies.

A feature and advantage of the present invention is the ability of such a device to provide an interactive license plate acting as a remote infrared target.

A feature and advantage of the present invention is the ability of such a device to enable law enforcement to regulate the speed, operation and location limits of a vehicle.

A feature and advantage of the present invention is the ability of such a device to prohibit operation of a vehicle by an unlicensed driver.

A feature and advantage of the present invention is the ability of such a device to prevent operation of a motor vehicle by an uninsured driver.

A feature and advantage of the present invention is the ability of such a device to prevent operation of a motor vehicle by criminals, including, but not limited to, bail jumpers, individuals who fail to pay child support and/or criminals who have warrants out for their arrest.

A feature and advantage of the present invention is the ability of such a device to provide law enforcement with up-to-date information on vehicle registration, licensing and status.

A feature and advantage of the present invention is the ability of such a device to enable law enforcement officials to remotely regulate and limit the vehicle operation specifications for habitual speeders.

A feature and advantage of the present invention is the ability of such a device to enable law enforcement officials to remotely regulate and limit the geographic specifications for vehicle operation by probationers with limited mobility rights.

A feature and advantage of the present invention is the ability of such a device to enable control over the operation of a motorized vehicle from a remote position.

A feature and advantage of the present invention is the ability of such a device to limit the operation of a vehicle to a particular time period.

A feature and advantage of the present invention is the ability of such a device to receive signals from an air support vehicle to effectively disable a motor vehicle.

A feature and advantage of the present invention is the ability of such a device to activate remote devices such as, for exemplary purposes only, traffic monitoring cameras, thereby notifying appropriate authorities of a violation.

A feature and advantage of the present invention is the ability of such a device to enable remote restriction of vehicle operation or performance, as necessary.

A feature and advantage of the present invention is the ability of such a device to provide authorities with a means of safe and direct contact with a vehicle operator.

A feature and advantage of the present invention is the ability of such a device to enable law enforcement officials to remotely issue fines, parking fees, and/or other traffic violation charges to a vehicle operator without having to leave the safety of their law enforcement vehicles and/or station.

A feature and advantage of the present invention is the ability of such a device to enable in-car, on-board payment of tolls, fines, parking fees and other charges.

A feature and advantage of the present invention is the ability of such a device to enable a vehicle owner to selectively limit operation of his vehicle.

A feature and advantage of the present invention is the ability of such a device to enable commercial carriers to remotely communicate data such as, for exemplary purposes only, weight, cargo, destination and originator.

A feature and advantage of the present invention is the ability of such a device to prevent unauthorized towing of a vehicle.

A feature and advantage of the present invention is the ability of such a device to be adjusted/modified to accommodate any type of motored and/or non-motored vehicle, including, but not limited to, motorcycles, scooter, cars, trucks, motor boats, boat homes, any uni/multi-wheeled vehicles and/or bicycles.

These and other objects, features and advantages of the invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Alternate Embodiments with reference to the accompanying drawing figures, in which like reference numerals denote similar structure and refer to like elements throughout, and in which.

DETAILED DESCRIPTION OF THE PREFERRED AND ALTERNATE EMBODIMENTS

In describing the preferred and alternate embodiments of the present invention, as illustrated in FIGS. 1–4 and/or described herein, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
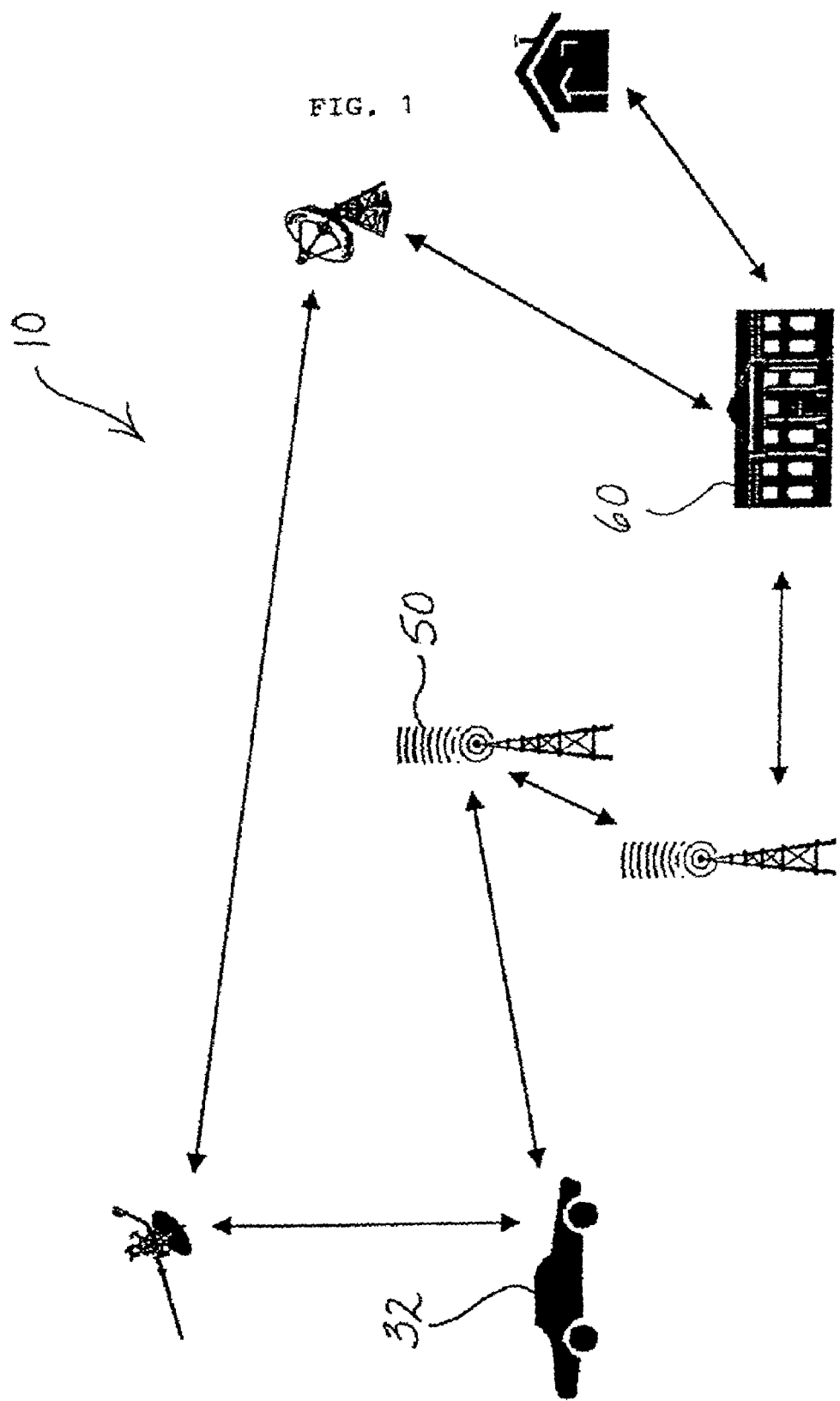
FIG. 1 is a pictorial overview of a motor vehicle verification and control system according to a preferred embodiment of the present invention, showing an equipped vehicle, a monitoring authority and wireless communication support equipment.
Figure 2:
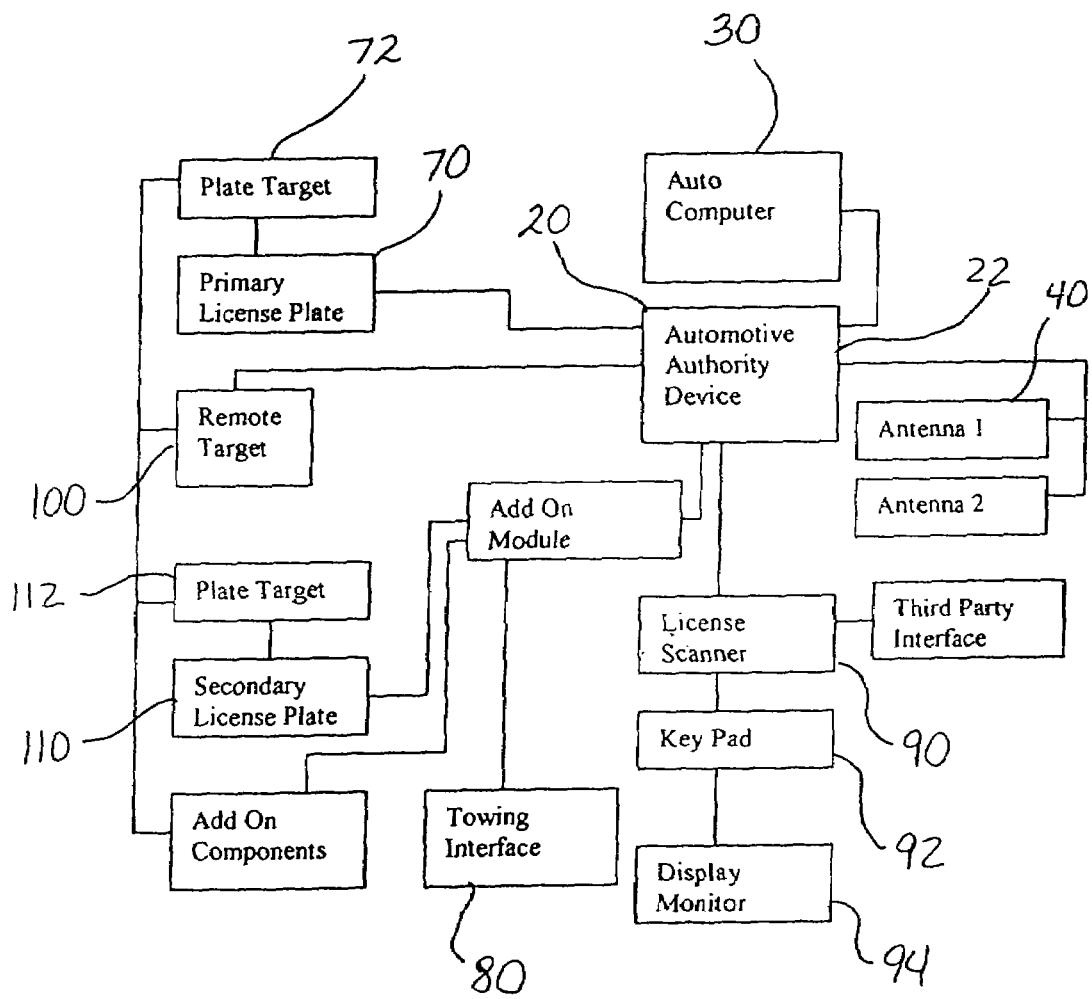
FIG. 2 is a diagram of the motor vehicle verification and control system of FIG. 1, showing the relationship of auxiliary components to an auto computer.
Figure 3:
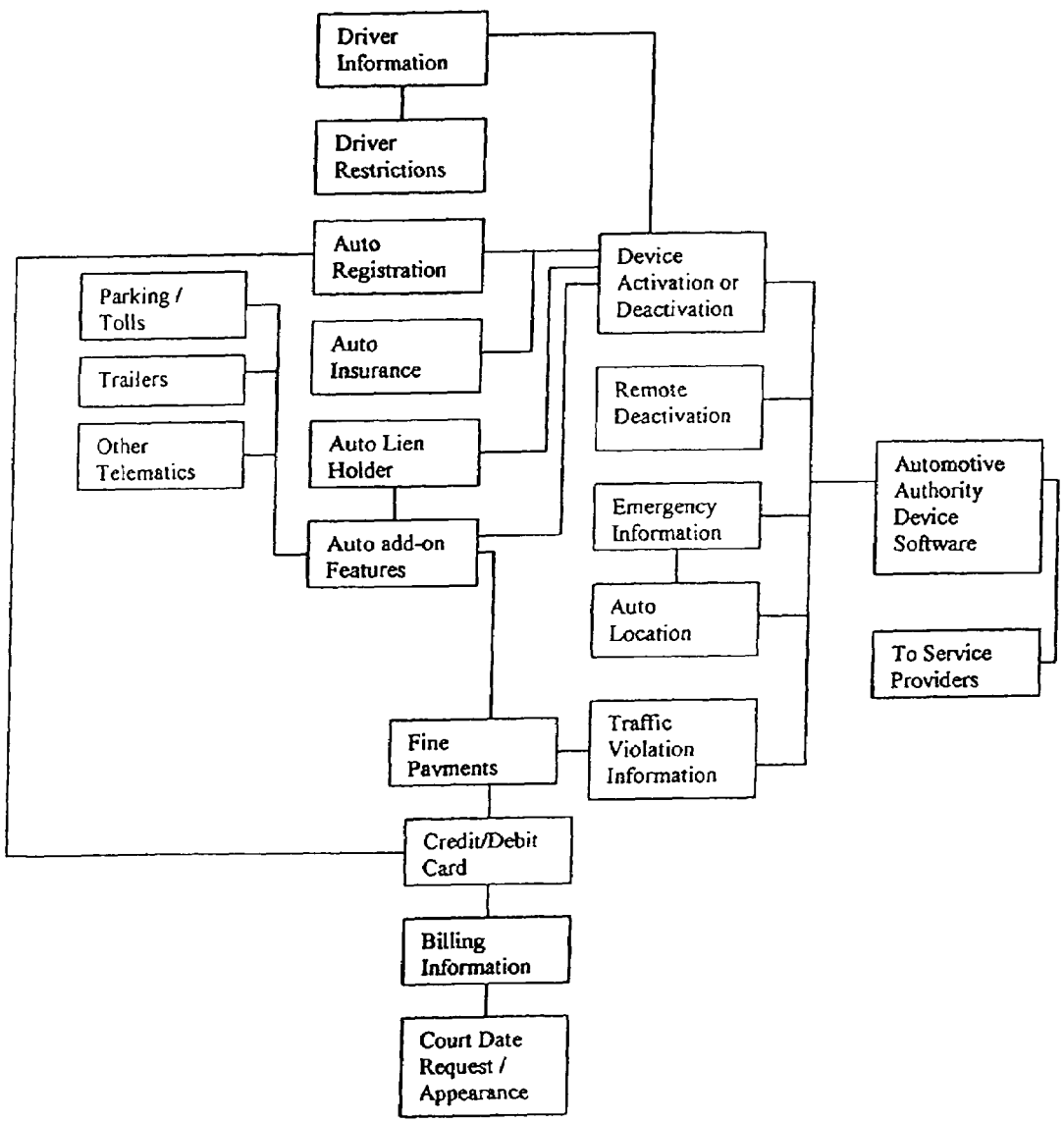
FIG. 3 is a diagram of the motor vehicle verification and control system of FIG. 1, showing features of support software.
Figure 4:
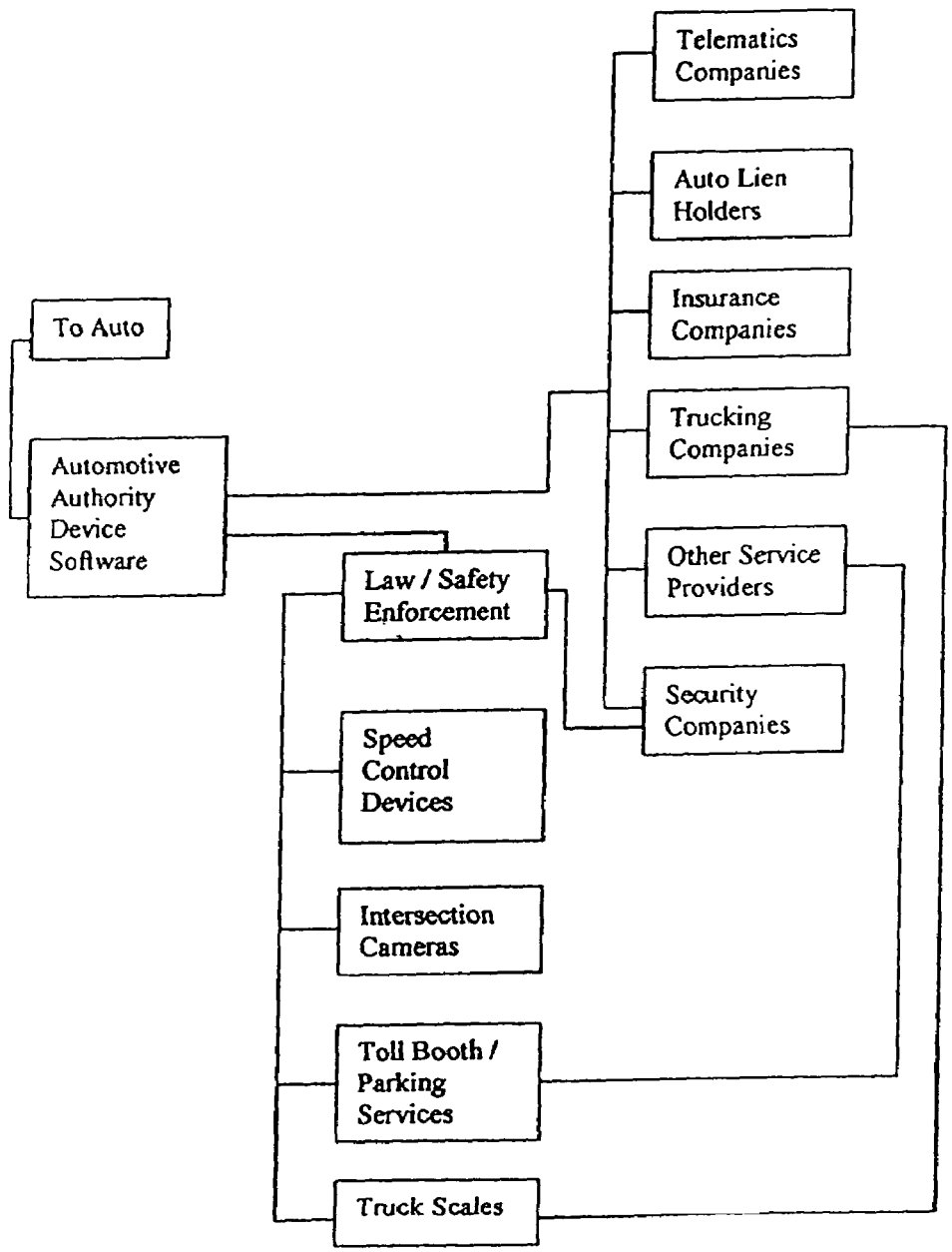
FIG. 4 is a diagram of the motor vehicle verification and control system of FIG. 1, showing related services provided thereby and representative users thereof.

Referring now to FIGS. 1 and 2, the present invention is a motor vehicle verification and control system 10, wherein on-board microprocessor and receiver 20 is preferably installed and communicatively linked to a vehicle's master computer 30. The on-board microprocessor and receiver 20, or computer brain 22, receives, preferably via at least one antenna 40, remotely generated and preferably encrypted signals 50 such as, for exemplary purposes only, analog, digital, G3, broadband, satellite, green light and/or infrared signals, and preferably interprets signals 50 to determine specifications for operation of a vehicle 32, wherein operation of vehicle 32 may preferably continue, uninterrupted or per limitations until expiration of a time period or until intervention by a monitoring agency 60, wherein preferably vehicle master computer 30 becomes a slave, overwritten and controlled by computer brain 22 of motor vehicle verification and control system 10, and may be remotely disabled.

Preferably, on-board microprocessor and receiver 20, or computer brain 22, is communicatively linked to interactive license plate 70, wherein each such license plate 70 preferably has a digital identifier corresponding to the appropriately related computer brain 22 and is thus specific for a particular vehicle 32. Recognizing the specificity, interactive license plate 70 could be appropriately installed during vehicle manufacture, by retrofit at the time of licensing or at any other time wherein appropriate authority and control is provided. If a replacement plate 70 becomes necessary, an appropriate monitoring agency 60 could so encode and notify the appropriate computer brain 22 of the replacement.

Interactive license plate 70 preferably has remote infrared target 72 for directly disabling equipped vehicle 32. Preferably, the digital identifier provides a backup means for remotely disabling equipped vehicle 32, wherein infrared target 72 is inaccessible or otherwise inappropriate. Preferably, to remotely disable vehicle 32, law enforcement authorities 60 may utilize the digital identifier to access a unique authority code permitting remote disabling of vehicle 32, wherein the unique authority code would be wirelessly transmitted to on-board microprocessor and receiver 20 and a command communicated to motor vehicle computer 30.

On-board microprocessor and receiver 20, or computer brain 22, may include towing module 80, wherein a trailer towed by vehicle 32 can preferably be monitored thereby and wherein vehicle 32 can preferably require authorization prior to being towed. Unauthorized towing of vehicle 32 preferably initiates a signal 50, or silent alarm, to monitoring agency 60, wherein proper response thereto would be initiated.

Safety features incorporated into multi-component motor vehicle verification and control system 10 preferably include automatic deactivation following tampering with any component thereof.

Preferably, on-board microprocessor and receiver 20 of motor vehicle verification and control system 10 can be remotely activated to enable locating, monitoring, controlling and disabling of equipped vehicle 32 and can receive signals 50 such as, for exemplary purposes only, analog, digital, broadband, satellite (i.e. GPS), green light and/or infrared signals.

Preferably, motor vehicle verification and control system 10 has a scanner 90, wherein a smart card driver's license could be scanned prior to operation of vehicle 32. Preferably, the smart-card driver's license is preprogrammed by authorities 60 to identify a driver and provide relevant information thereabout such as, for exemplary purposes only, outstanding fines, warrants, previous arrests or driving record. Scanner 90 preferably communicates relevant information to on-board microprocessor and receiver 20, wherein the information is interpreted and vehicle operational and performance constraints such as, for exemplary purposes only, limitations on speed, hours of operation and geographical boundaries of travel, are communicated to vehicle central computer 30, and wherein such constraints are preferably initiated. Scanner 90 also enables tracking and monitoring of commercial drivers and thereby ensures adherence to maximum hour per driver guidelines.

Preferably, scanner 90 enables utilization of a credit, debit or variable value cash card for on-board payment of tolls, fines, parking fees and other charges by a vehicle occupant.

Preferably, scanner 90 is incorporated into an on-board display and scanner module with keypad 92 and display monitor 94, wherein motor vehicle verification and control system 10 provides authorities 60 with safe and direct contact with a vehicle operator via display monitor 94.

Keypad 92 preferably enables a vehicle owner to selectively limit operation of his or her vehicle 32 to specific individuals, a limited geographic area, a limited operational period, or limited speeds as desired. While input of such limitations and specification via keypad 92 is preferred, alternate means of input and programming known in the art could be utilized such as, for exemplary purposes only, display monitor 94 could have touch-screen programming capabilities or on-board microprocessor and receiver 20 could receive voice commands.

Motor vehicle verification and control system 10 preferably includes target 100 for receiving disabling digital and infrared signals and for enabling vehicle tracking via GPS, wherein target 100 is preferably installed on an exterior surface of equipped vehicle 32 such as, for exemplary purposes only, a roof, hood or trunk. Preferably, a law enforcement air support vehicle such as a helicopter can disable vehicle 32 by sending a signal 50 to target 100, wherein target 100 communicates receipt of signal 50 to on-board microprocessor and receiver 20 and wherein on-board microprocessor and receiver 20 enslaves vehicle central computer 30 and disables vehicle 32. Preferably, target 100 serves as a remote activator for remote devices such as, for exemplary purposes only, traffic monitoring cameras, thereby notifying appropriate authorities 60 of a violation committed by vehicle 32.

Preferably, motor vehicle verification and control system 10 includes software for utilization by monitoring agency 60 and on-board microprocessor and receiver 20, wherein the software enables monitoring agency 60 and on-board microprocessor and receiver 20 to transmit and receive preferably encrypted data such as, but not limited to, vehicle registration data, outstanding fees and fines, driver information, insurance details and vehicle tracking data. The software is configured to interpret data and signal an appropriate course of action.

In an alternate embodiment, on-board microprocessor and receiver 20, or computer brain 22, is communicatively linked to interactive auxiliary license plate 110, wherein each such auxiliary license plate 110 preferably has a digital identifier corresponding to the appropriately related and designated computer brain 22 and may thus be rendered specific for a particular vehicle 32 and exchanged and reprogrammed for another vehicle as necessary. Auxiliary license plate 110 could be utilized wherein commercial carriers desire to remotely communicate data such as, for exemplary purposes only, weight, cargo, destination and originator to a weigh station or the like. Utilization of auxiliary license plate 110 could enable commercial cargo carriers to directly monitor or locate cargo. Like interactive license plate 70, auxiliary license plate 110 could have a remote infrared target 112 for directly disabling equipped vehicle 32 and the digital identifier could provide a backup means for remotely disabling equipped vehicle 32, wherein the infrared target 112 is inaccessible or otherwise inappropriate.

In an alternate embodiment, a limited function, secondary motor vehicle verification and control system device could be provided to enable third party vehicle tracking, wherein direct notification to monitoring authority 60 could result from unauthorized vehicle operation or from other inappropriate, predesignated actions. Third party users of alternate secondary motor vehicle verification and control system device could be interested parties such as, for exemplary purposes only, corporate owners, lien holders, insurers, car rental agencies or guardians.

In an alternate embodiment, multi-component motor vehicle verification and control system 10 could enable monitoring agency 60 to limit access to the system monitored thereby, wherein rights could be licensed for the manufacture of compatible peripheral devices such as, for exemplary purposes only, traffic cameras, speed and toll devices and of potentially integrated components such as, for exemplary purposes only, personal data assistants, cellular telephones and other wireless telecommunications devices. Such licensed rights for peripheral devices could provide financial incentive and rewards for monitoring agency participation.

In use, on-board microprocessor and receiver 20, interactive license plate 70 and scanner 90 are installed into vehicle 32. Preferably, monitoring agency 60 initiates monitoring of vehicle 32. Scanner 90 preferably reports detailed information to monitoring agency 60 regarding an operator of vehicle 32, wherein if operational limitations are appropriate, a signal is sent to on-board microprocessor and receiver 20 and vehicle 32 responds. If disabling or tracking of vehicle 32 becomes necessary, monitoring agency 60 can remotely follow and disable vehicle 32 by either relying on interactive license plate 70 or via signals to and from on-board microprocessor and receiver 20. If monitoring agency 60 requires contact with an operator of vehicle 32, on-board display monitor 94 enables safe and direct communication.

Having thus described exemplary embodiments of the present invention, it should be noted by those skilled in the art that the within disclosures are exemplary only, and that various other alternatives, adaptations, and modifications may be made within the scope of the present invention. Accordingly, the present invention is not limited to the specific embodiments illustrated herein, but is limited only by the following claims.

What is claimed is:

1. A vehicle verification and control system device, comprising:
    a microprocessor, wherein said microprocessor is carried by a vehicle and said microprocessor can command a vehicle master computer, override driver operator control and dictate specific limitations and performance parameters for an operational vehicle;
    a receiver, wherein said receiver can receive at least one signal for said microprocessor;
    a transmitter, wherein said transmitter sends said at least one signal to said receiver;
    a monitoring means, wherein said monitoring means records receipt of said at least one signal and determines physical proximity of the vehicle; and,
    at least one license plate, said license plate digitally encoded to said microprocessor and said license plate carrying an infrared receptor, wherein receipt of an infrared signal by said infrared receptor initiates a disabling command from said microprocessor to the vehicle master computer.

2. The vehicle verification and control device of claim 1, wherein said microprocessor and said receiver comprise a central computer brain.

3. The vehicle verification and control device of claim 1, further comprising at least one antenna.

4. The vehicle verification and control device of claim 1, wherein each said at least one signal is analog.

5. The vehicle verification and control device of claim 1, wherein each said at least one signal is digital.

6. The vehicle verification and control device of claim 1, wherein each said at least one signal is G3.

7. The vehicle verification and control device of claim 1, wherein each said at least one signal is broadband.

8. The vehicle verification and control device of claim 1, wherein each said at least one signal is satellite.

9. The vehicle verification and control device of claim 1, wherein each said at least one signal is infrared.

10. The vehicle verification and control device of claim 1, wherein said digital encoding of said license plate enables remote transmission of said disabling command.

11. The vehicle verification and control device of claim 1, further comprising a towing module, said towing module initiating an authorization sequence prior to towing of the vehicle, wherein failure of said authorization sequence initiates a response.

12. The vehicle verification and control device of claim 1, further comprising a tampering guard, wherein said tampering guard initiates deactivation of said microprocessor in response to unauthorized interference with at least one component of said vehicle verification and control device.

13. The vehicle verification and control device of claim 1, further comprising a scanner, wherein said scanner can communicate collected data to said microprocessor, wherein said microprocessor issues at least one command to said vehicle master computer in response to said data.

14. The vehicle verification and control device of claim 13, wherein said at least one command issued by said microprocessor imposes at least one operational and performance constraint on the vehicle.

15. The vehicle verification and control device of claim 13, wherein said data collected by said scanner is transmitted to a remote receiver.

16. The vehicle verification and control device of claim 13, further comprising a visual display module communicatively linked with said microprocessor.

17. The vehicle verification and control device of claim 16, wherein said visual display module communicates data remotely transmitted thereto.

18. The vehicle verification and control device of claim 16, further comprising a data entry means.

19. The vehicle verification and control device of claim 18, wherein said data entry means is a keypad.

20. The vehicle verification and control device of claim 18, wherein said data entry means is a touch-screen incorporated into said visual display module.

21. The vehicle verification and control device of claim 18 wherein said data entry means is voice recognition hardware and software.

22. The vehicle verification and control device of claim 1, further comprising a target, said target carried on an external surface of the vehicle and said target enabling receipt of overhead signals and transmission of said overhead signals to said microprocessor, wherein an appropriate response is communicated to said vehicle master computer.

23. The vehicle verification and control device of claim 22, wherein said target acts as a remote activator for at least one traffic surveillance device.

24. A combination tracking, computer-override device for a vehicle and a remote system for an authority to monitor, disable or limit performance of the vehicle, comprising:
   a microprocessor, wherein said microprocessor is carried by a vehicle and said microprocessor can command a vehicle master computer;
   a receiver, wherein said receiver can receive at least one signal for said microprocessor;
   at least one license plate, wherein said license plate is specifically encoded to communicate with said microprocessor, wherein said license plate carries an infrared receptor, and wherein receipt of an encoded or infrared signal directs said microprocessor to disable the vehicle;
   a transmitter, wherein said transmitter sends said at least one signal to said receiver;
   a monitoring means, wherein said monitoring means records receipt of said at least one signal and determines physical proximity of the vehicle;
   a towing module, said towing module initiating an authorization sequence prior to towing of the vehicle, wherein failure of said authorization sequence initiates a response;
   a tampering guard, wherein said tampering guard initiates deactivation of said microprocessor in response to unauthorized interference with at least one component of said vehicle verification and control device;
   a scanner, wherein said scanner can communicate collected data to said microprocessor, wherein said microprocessor can issue at least one command to said vehicle master computer in response to said data, and wherein said data collected by said scanner can be transmitted to a remote receiver;
   a visual display module communicatively linked with said microprocessor, wherein said visual display module can communicate data remotely transmitted thereto;
   a data entry module for said microprocessor; and
   a target, said carried on an external surface of the vehicle and said target enabling receipt of overhead signals and transmission of said overhead signals to said microprocessor, wherein an appropriate response can be communicated to the vehicle master computer, and wherein said target serves as a remote activator for at least one traffic monitoring device.

25. A method of remotely monitoring and influencing operation of a vehicle, comprising the steps of:
   a) obtaining a vehicle verification and control system having a microprocessor, wherein said microprocessor is carried by a vehicle and said microprocessor can command a vehicle master computer; a receiver, wherein said receiver can receive at least one signal for said microprocessor; at least one license plate, wherein said license plate is specifically encoded to communicate with said microprocessor, wherein said license plate carries an infrared receptor, and wherein receipt of an encoded or infrared signal directs said microprocessor to disable the vehicle; a transmitter, wherein said transmitter sends said at least one signal to said receiver; and a monitoring means, wherein said monitoring means records receipt of said at least one signal and determines physical proximity of the vehicle;
   b) installing said microprocessor, said receiver and said license plate on a vehicle;
   c) providing said monitoring means and said transmitter to an authority;
   d) sending at least one signal to monitor the physical location of the vehicle; and
   e) sending at least one signal to influence operation of the vehicle.

* * * * *